United States Patent
Tamura et al.

(10) Patent No.: US 10,570,820 B2
(45) Date of Patent: Feb. 25, 2020

(54) NOZZLE, COMBUSTION APPARATUS, AND GAS TURBINE

(71) Applicant: MITSUBISHI HITACHI POWER SYSTEMS, LTD., Kanagawa (JP)

(72) Inventors: Issei Tamura, Tokyo (JP); Shinji Akamatsu, Tokyo (JP); Keijiro Saito, Tokyo (JP); Kotaro Miyauchi, Tokyo (JP); Tomo Kawakami, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 314 days.

(21) Appl. No.: 15/031,051

(22) PCT Filed: Nov. 26, 2014

(86) PCT No.: PCT/JP2014/081186
§ 371 (c)(1),
(2) Date: Apr. 21, 2016

(87) PCT Pub. No.: WO2015/080131
PCT Pub. Date: Jun. 4, 2015

(65) Prior Publication Data
US 2016/0265431 A1    Sep. 15, 2016

(30) Foreign Application Priority Data

Nov. 29, 2013  (JP) ................................. 2013-247076

(51) Int. Cl.
*F02C 3/30* (2006.01)
*F23R 3/28* (2006.01)
*F23L 7/00* (2006.01)

(52) U.S. Cl.
CPC ................ *F02C 3/30* (2013.01); *F23L 7/002* (2013.01); *F23R 3/28* (2013.01); *F05D 2220/32* (2013.01); *F23R 2900/00013* (2013.01)

(58) Field of Classification Search
CPC .... F02C 3/30; F02C 3/305; F02C 7/22; F23R 3/343; F23R 2900/00013; F23R 3/14;
(Continued)

(56) References Cited

U.S. PATENT DOCUMENTS 3,763,650 A * 10/1973 Hussey ................. F23D 11/104
239/561
6,349,536 B1 * 2/2002 Fujioka ..................... F02C 3/30
60/39.55
(Continued)

FOREIGN PATENT DOCUMENTS

EP      1207344      5/2002
EP      1 239 219    9/2002
(Continued)

OTHER PUBLICATIONS

Office Action dated Jun. 17, 2016 in Taiwan patent application No. 103141342 (with partial English translation of search report).
(Continued)

*Primary Examiner* — Ehud Gartenberg
*Assistant Examiner* — Jacek Lisowski
(74) *Attorney, Agent, or Firm* — Wenderoth, Lind & Ponack, L.L.P.

(57) ABSTRACT

A combustion apparatus includes a nozzle in which a fuel injection port for injecting a fuel is formed on the center of a tip. A plurality of water injection ports are formed with intervals therebetween in a circumferential direction around
(Continued)

the fuel injection port of the tip of the nozzle, and the water injection ports are non-uniformly formed in the circumferential direction.

8 Claims, 9 Drawing Sheets

(58) Field of Classification Search
CPC .... F23R 3/286; F23R 3/04; F23R 3/12; F23R 3/28; F23L 7/002; F23L 2900/07008; F23D 11/12; F23D 17/002; F23D 2900/14005; F23D 2900/14681; F23C 2900/07021; F23C 7/004; F23C 7/008; F05D 2250/37–38; F05D 2250/40; F05D 2250/73

See application file for complete search history.

(56) References Cited

U.S. PATENT DOCUMENTS

| | | | |
|---|---|---|---|
| 6,662,547 B2* | 12/2003 | Mandai | F23D 11/38 239/424 |
| 7,171,813 B2 | 2/2007 | Tanaka et al. | |
| 2002/0061485 A1* | 5/2002 | Mandai | F23D 11/38 431/4 |
| 2004/0035114 A1* | 2/2004 | Hayashi | F23R 3/18 60/737 |
| 2006/0101814 A1* | 5/2006 | Saitoh | F23R 3/286 60/377 |
| 2007/0075158 A1* | 4/2007 | Pelletier | B05B 1/3436 239/11 |
| 2009/0241548 A1 | 10/2009 | Danis et al. | |
| 2011/0314831 A1 | 12/2011 | Abou-Jaoude et al. | |

FOREIGN PATENT DOCUMENTS

| | | |
|---|---|---|
| EP | 1391657 | 2/2004 |
| EP | 2634487 | 9/2013 |
| JP | 63-186940 | 11/1988 |
| JP | 11-294770 | 10/1999 |
| JP | 11-311404 | 11/1999 |
| JP | 2001-41454 | 2/2001 |
| JP | 2002-156115 | 5/2002 |
| JP | 2003-035417 | 2/2003 |
| JP | 2003-120934 | 4/2003 |
| JP | 2004-138376 | 5/2004 |
| JP | 2007-155170 | 6/2007 |
| JP | 3960222 | 8/2007 |
| JP | 2011-516809 | 5/2011 |
| JP | 2013-530371 | 7/2013 |
| TW | 334502 | 6/1998 |
| WO | 2009/121776 | 10/2009 |
| WO | 2009/123851 | 10/2009 |
| WO | 2011/163289 | 12/2011 |

OTHER PUBLICATIONS

English translation of Office Action dated May 16, 2017 in corresponding Chinese patent application No. 201480060669.8 previously cited in IDS filed on Jun. 22, 2017.
Office Action dated May 16, 2017 in corresponding Chinese patent application No. 201480060669.8.
Written Opinion of the International Searching Authority dated Mar. 3, 2015 in International Application No. PCT/JP2014/081186 (with English translation).
International Search Report dated Mar. 3, 2015 in International Application No. PCT/JP2014/081186.

* cited by examiner

NOZZLE, COMBUSTION APPARATUS, AND GAS TURBINE

TECHNICAL FIELD

The present invention relates to a nozzle, a combustion apparatus, and a gas turbine.

Priority is claimed on Japanese Patent Application No. 2013-247076, filed Nov. 29, 2013, the content of which is incorporated herein by reference.

BACKGROUND ART

As a combustion apparatus of a gas turbine, there is a combustion apparatus which includes a pilot fuel nozzle, and a plurality of main fuel nozzles provided around the pilot fuel nozzle. In the combustion apparatus, the stability of main pre-mixed flames is improved in diffusion flames formed by the pilot fuel nozzle.

Patent Document 1 discloses a configuration in which a region which does not have fuel injection holes is provided in some of pilot fuel nozzles in a circumferential direction, and fuel injected from the pilot fuel nozzles is non-uniformly distributed in the circumferential direction. In addition, Patent Document 1 discloses a configuration which causes the fuel injection amount of the fuel between a plurality of main fuel nozzles to be different from each other so as to non-uniformly distribute the fuel, which is injected from the plurality of main fuel nozzles to the outer circumferential sides of the pilot fuel nozzles, in the circumferential direction.

According to this configuration, the lengths of flames formed by combustion of the fuel are different from each other in the circumferential direction, and since the heat release rate is distributed, combustion oscillation decreases.

Patent Document 2 discloses a configuration in which fuel injection holes are respectively provided at a plurality of positions different from each other in an axial direction in a plurality of main fuel nozzles. In addition, Patent Document 2 discloses a configuration in which the fuel injection holes are respectively provided at a plurality of positions different from each other in the axial direction in the plurality of main fuel nozzles, and fuel injection angles from the fuel injection holes are different from each other. According to this configuration, periods of time elapsed from when fuel (pre-mixed gas) injected from the main fuel nozzles reaches flames are different from each other between the plurality of fuel injection holes having different positions in the axial direction, and combustion oscillation decreases.

PRIOR ART DOCUMENT

Patent Document

Patent Document 1: Japanese Unexamined Patent Application, First Publication No. H11-294770
Patent Document 2: Japanese Unexamined Patent Application, First Publication No. 2003-120934

SUMMARY OF INVENTION

Technical Problem

In recent years, there is a combustion apparatus having a method which injects water to flames in order to decrease emission of NOx (nitrogen dioxide) by decreasing the temperatures of the flames in the combustion apparatus.

In the combustion apparatus, it is necessary to effectively decrease combustion oscillation.

The present invention provides a nozzle, a combustion apparatus, and a gas turbine capable of effectively decreasing combustion oscillation, even in a combustion apparatus in which water is injected to flames.

Technical Solution

A first aspect of the present invention includes a nozzle in which a fuel injection port for injecting a fuel is formed on the center of a tip and a plurality of water injection ports are formed with intervals therebetween in a circumferential direction around the fuel injection port of the tip, in which the water injection ports are non-uniformly formed in the circumferential direction.

According to this configuration, water injected from the water injection ports are non-uniformly injected in the circumferential direction with respect to flames generated by the fuel injected from the fuel injection port. Accordingly, axial positions of the flames are not uniform in the circumferential direction. Therefore, the axial positions of the flames, or the axial positions of the flames generated by fuel ignited by the flames are different from each other in the circumferential direction, and the heat release rate is distributed so as to decrease combustion oscillation.

According to a second aspect of the present invention, in the nozzle of the first aspect, some of the plurality of water injection ports may be formed such that inclination angles with respect to the center axis of the nozzle in a radial direction of the nozzle are different from inclination angles of the remaining water injection ports.

Accordingly, the injection angle of water which is injected from the water injection ports to a partial region in the circumferential direction is different from an injection angle of water which is injected from the water injection ports to remaining regions, except for the partial region, in a radial direction of the nozzle. Therefore, it is possible to non-uniformly inject water to flames in the circumferential direction.

According to a third aspect, in the nozzle of the first or second aspect, some of the plurality of water injection ports may be formed such that the inclination angles with respect to the center axis of the nozzle in a circumferential direction of the nozzle are different from the inclination angles of the remaining water injection ports.

Accordingly, the injection angle of water which is injected from the water injection ports to a partial region in the circumferential direction is different from the injection angle of water which is injected from the water injection ports to remaining regions, except for the partial region, in the circumferential direction of the nozzle (that is, a tangential direction at the position of the water injection port). Therefore, it is possible to non-uniformly inject water to flames in the circumferential direction.

According to a fourth aspect of the present invention, in the nozzle of any one of the first to third aspects, some of the plurality of water injection ports may be formed such that opening diameters are different from opening diameters of the remaining water injection ports.

Accordingly, an injection amount of water which is injected from the water injection ports to a partial region in the circumferential direction is different from an injection amount of water which is injected from the water injection ports to remaining regions except for the partial region. Therefore, it is possible to non-uniformly inject water to flames in the circumferential direction.

According to a fifth aspect of the present invention, in the nozzle of any one of the first to fourth aspects, some of the plurality of water injection ports may be formed such that opening positions of a diameter direction of the nozzle are different from opening positions of the remaining water injection ports.

Accordingly, the distance from the point at which the water injected from the water injection ports is injected from a partial region in the circumferential direction to the point at which the water reaches flames generated by a fuel injected from a fuel injection port positioned at the center portion is different from the distance from the point at which the water injected from the water injection ports is injected from remaining regions, except for the partial region, to the point at which the water reaches the flames. Therefore, it is possible to non-uniformly inject water to flames in the circumferential direction.

According to a sixth aspect of the present invention, in the nozzle of any one of the first to fifth aspects, some of the plurality of water injection ports may be formed such that installation intervals in the circumferential direction of the nozzles are different from those of the remaining water injection ports.

Accordingly, the injection amount (injection density) of the water injected from the water injection ports to a partial region in the circumferential direction is different from the injection amount of the water injected from the water injection ports to the remaining regions except for the partial region. Therefore, it is possible to non-uniformly inject water to flames in the circumferential direction.

According to a seventh aspect of the present invention, there is provided a combustion apparatus, including: a main nozzle which injects a fuel; and a pilot nozzle which generates flames to ignite the fuel injected from the main nozzle, in which the pilot nozzle may be the pilot nozzle according to any one of the first to sixth aspects.

Accordingly, it is possible to make flames for ignition generated by the pilot nozzle be non-uniform in the circumferential direction. Therefore, flames generated by the fuel injected from the main nozzle are also non-uniform in the circumferential direction.

According to an eighth aspect of the present invention, in the combustion apparatus of the seventh aspect, the pilot nozzle may be disposed in the center portion, and a plurality of the main nozzles may be provided on an outer circumferential side of the pilot nozzle in a circumferential direction.

A ninth aspect of the present invention includes a gas turbine, including: the combustion apparatus according to the seventh or eighth aspect; and a turbine main body which is driven by combustion gas generated by the combustion apparatus.

According to the gas turbine, it is possible to decrease combustion oscillation due to flames in the combustion apparatus.

Advantageous Effects

According to the nozzle, it is possible to effectively decrease combustion oscillation, even in the combustion apparatus in which water is injected to flames.

DESCRIPTION OF EMBODIMENTS

First Embodiment

Hereinafter, a combustion apparatus 3 according to a first embodiment of the present invention will be described with reference to the drawings.

Figure 1:
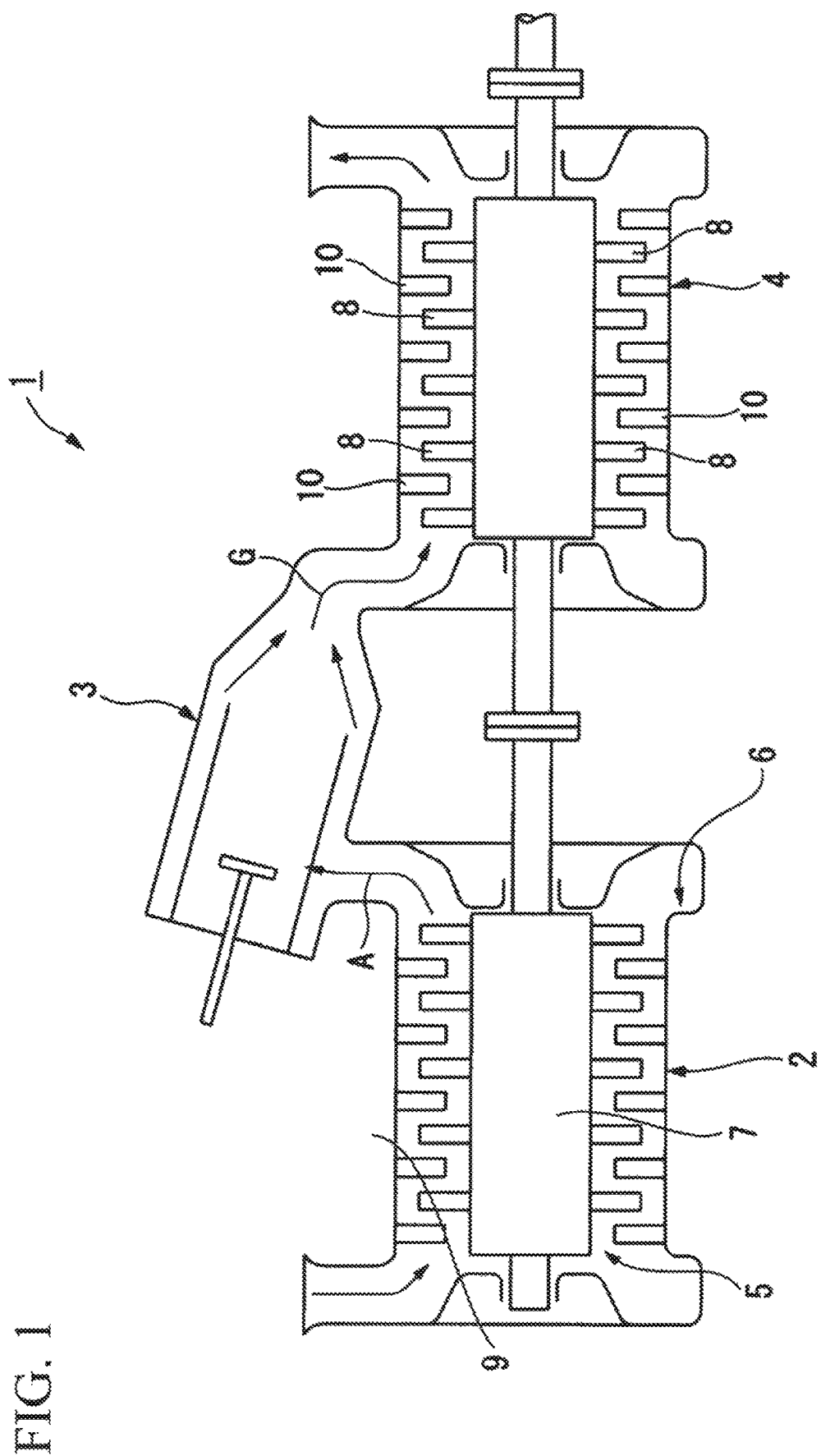
FIG. 1 is a schematic view showing the entire configuration of a gas turbine according to a first embodiment of the present invention.

As shown in FIG. 1, a gas turbine 1 of the present embodiment includes a compressor 2 in which a large amount of air is sucked in the inner portion and is compressed, the combustion apparatus 3 in which compressed air A compressed by the compressor 2 is mixed with a fuel and the mixture is combusted, and a turbine main body 4 by which thermal energy of combustion gas G introduced from the combustion apparatus 3 is converted into rotation energy.

The compressor 2 and the turbine main body 4 respectively include rotors 5 which are connected so as to rotate integrally with each other, and stators 6 which surround outer circumferences of the rotors 5. Each rotor 5 includes a rotary shaft 7, and a plurality of annular blade groups 8 which are fixed with intervals therebetween in an axial direction. Each annular blade group 8 is configured so as to include a plurality of blades, which are fixed with intervals therebetween in a circumferential direction, on the outer circumference of the rotary shaft 7.

Each stator 6 includes a casing 9, and a plurality of annular vane groups 10 which are fixed with intervals in the axial direction in the casing 9. Each annular vane group 10 includes a plurality of vanes which are fixed to the inner surface of the casing 9 with intervals therebetween in the circumferential direction.

The plurality of vane groups 10 and the plurality of annular blade groups 8 are alternately disposed in the axial direction.

Figure 2:
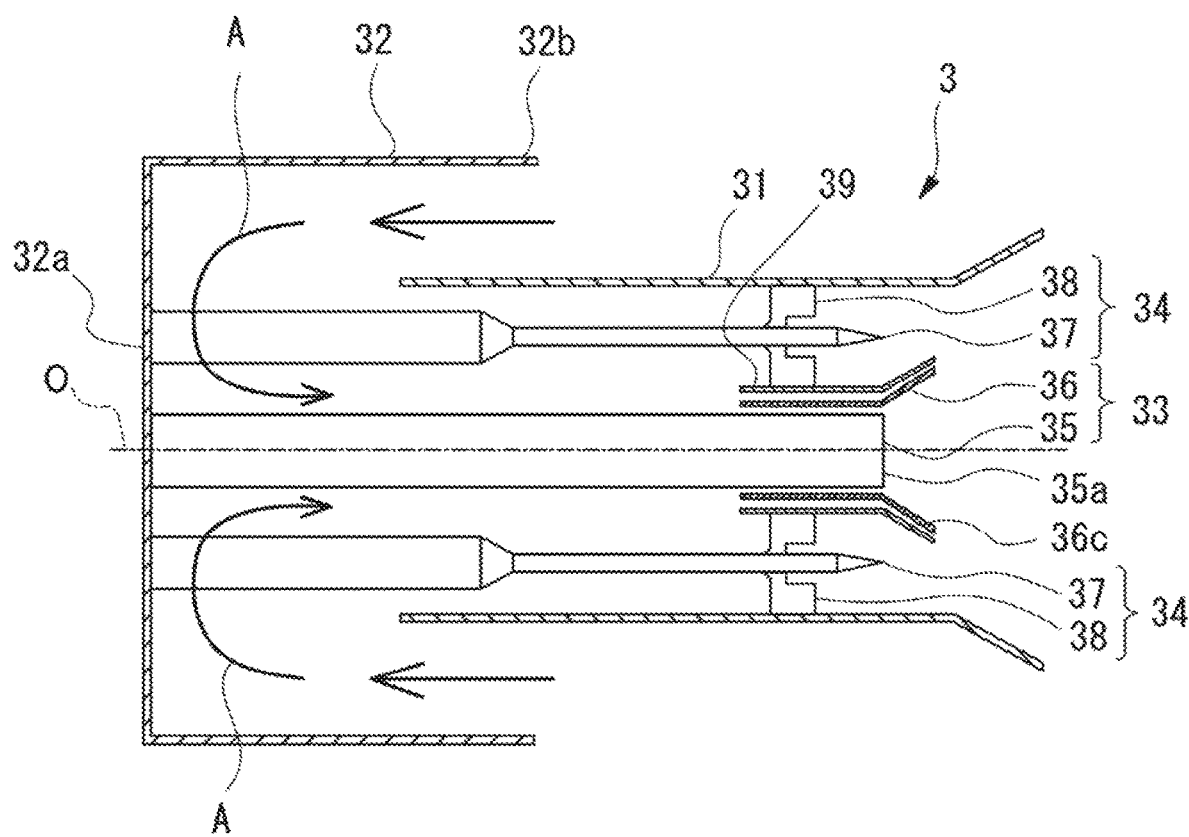
FIG. 2 is a side sectional view showing a schematic configuration of a combustion apparatus.

As shown in FIG. 2, the combustion apparatus 3 of the present embodiment includes a cylindrical combustor basket 31, and an outer shell 32 which is concentrically provided on the outer circumferential side on first end side in a center axis direction of the combustor basket 31.

First end side 32a of the outer shell 32 is closed, and second end side 32b thereof is open from the outer circumferential side of the combustor basket 31. The compressed air A flowing from a portion between the inner circumferential surface of the second end side 32b of the outer shell 32 and the outer circumferential surface of the combustor basket 31 into the combustion apparatus 3 rotates 180° at the first end side 32a of the outer shell 32, and is supplied into the combustor basket 31.

Figure 3:
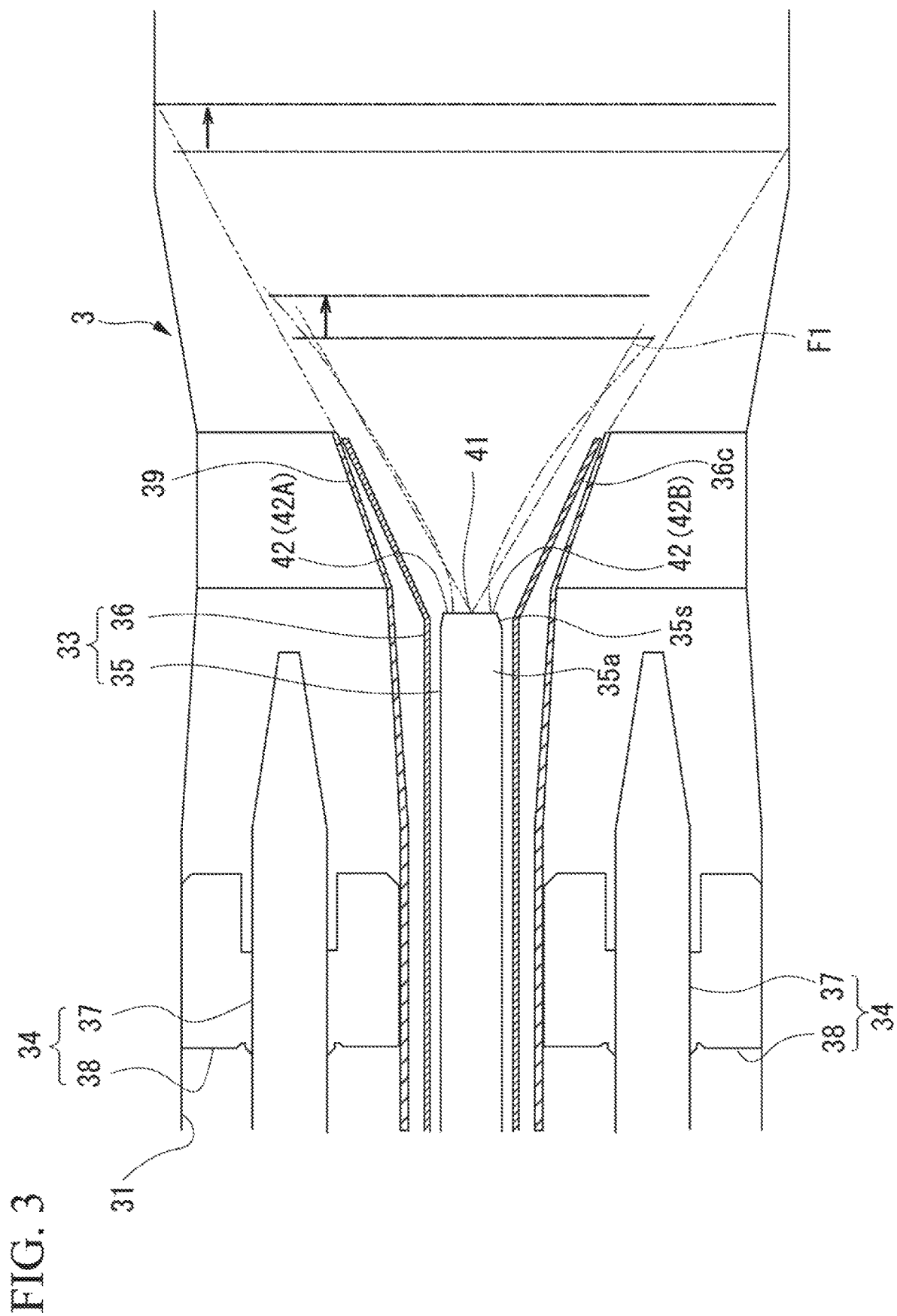
FIG. 3 is a side sectional view showing a configuration of a main portion of the combustion apparatus.

As shown in FIGS. 2 and 3, a pilot burner 33 which is provided on the center portion of the combustor basket 31, and a plurality of main burners 34 which are provided on the outer circumferential side of the pilot burner 33 with intervals therebetween in the circumferential direction are provided inside the combustor basket 31.

The pilot burner 33 includes a pilot nozzle 35 and a pilot cone 36.

The pilot nozzle 35 is provided along a center axis O of the combustor basket 31 from the first end side 32a of the outer shell 32. The pilot nozzle 35 injects a fuel, which is supplied via a fuel supply path (not shown) from the first end side 32a of the outer shell 32, from a tip portion 35a, and the fuel is ignited so as to generate flames.

The pilot cone 36 is formed in a tubular shape, and is provided on the outer circumferential side of the tip portion 35a of the pilot nozzle 35. The pilot cone 36 has a tapered cone portion 36c in which an inner diameter gradually increases from the vicinity of the tip portion 35a of the pilot nozzle 35 toward a generation direction of the flames, and regulates the diffusion range and the direction of the flames so as to increase flame insulation properties.

Each main burner 34 includes a main nozzle 37 and a main swirler 38. A tubular outer circumferential cone 39 is provided on the outer circumference of the pilot cone 36. The plurality of main nozzles 37 are provided with intervals therebetween in the circumferential direction in a region between the outer circumferential surface of the outer circumferential cone 39 and the inner circumferential surface of the combustor basket 31. The main nozzles 37 are provided so as to be parallel to the center axis O of the combustor basket 31 from the first end side 32a of the outer shell 32.

The main swirler 38 is provided on the tip portion of each main nozzle 37. A fuel (main fuel) is injected from a fuel nozzle (not shown) to the outer circumferential surface side of the main nozzle 37 on the air flow upstream side of the main swirler 38. In addition, this fuel is mixed with the compressed air A inside the combustor basket 31 in the main burners 34 by the main swirlers 38 to generate pre-mixed gas.

The pilot nozzle 35 of the present embodiment injects water toward flames so as to decrease temperatures of the flames and decrease NOx. Hereinafter, a configuration of the pilot nozzle 35 will be described.

Figure 4:
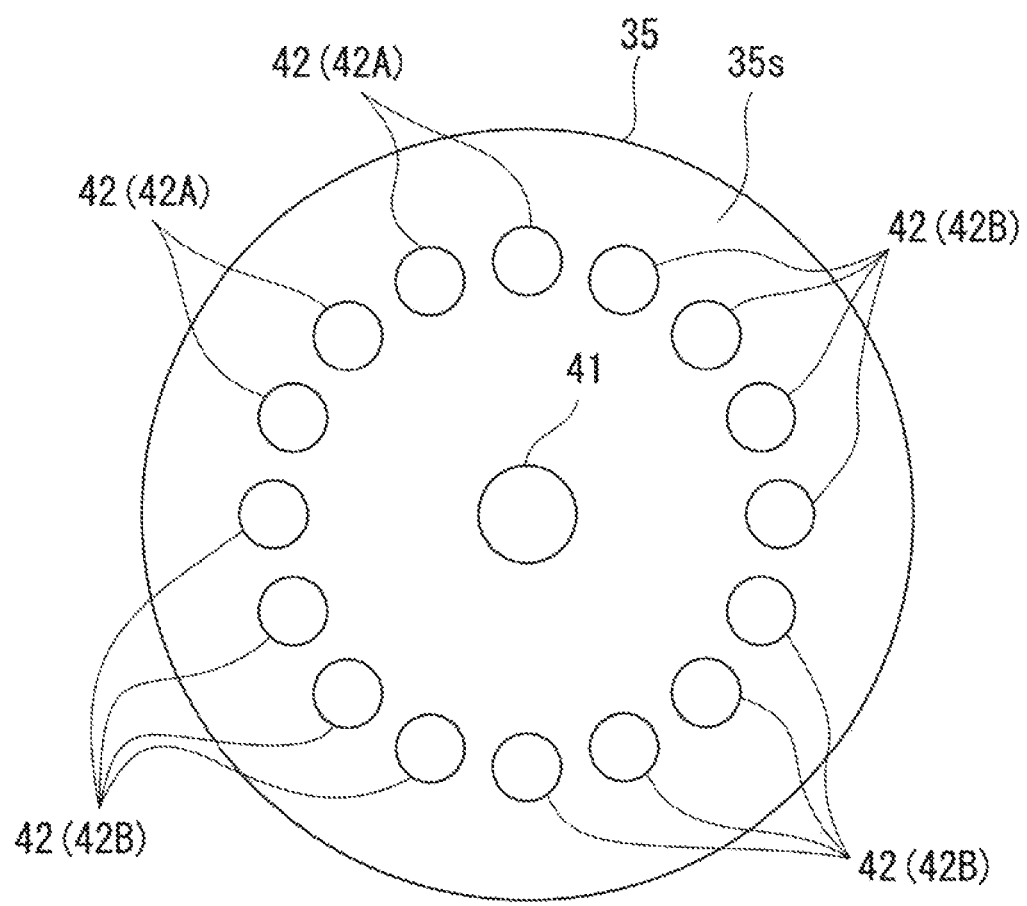
FIG. 4 is a front view showing a tip surface of the combustion apparatus according to the first embodiment.
Figure 5:
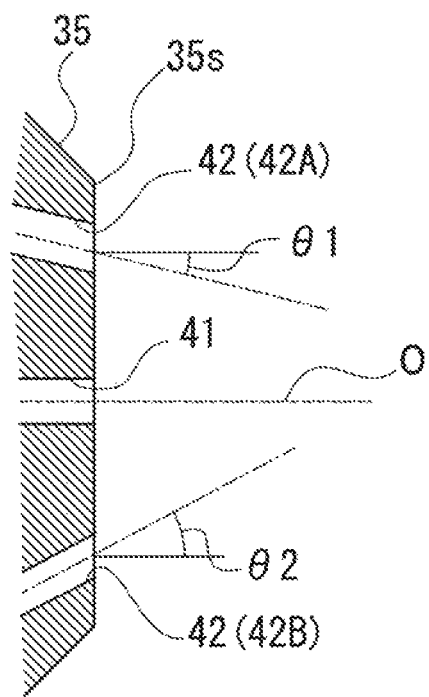
FIG. 5 is a side sectional view showing a fuel injection port and a water injection port which are formed on tip surface of the combustion apparatus.

As shown in FIGS. 4 and 5, the pilot nozzle 35 includes a fuel injection port 41 for injecting a fuel in the center of a tip surface (tip) 35s. The fuel is supplied from a fuel supply source (not shown) to the fuel injection port 41 through a fuel passage which is formed in the pilot nozzle 35.

A plurality of water injection ports 42 are formed around the fuel injection port 41 of the tip surface 35s of the pilot nozzle 35 with intervals therebetween in the circumferential direction. Water is supplied from a water supply source (not shown) to the water injection ports 42 through water passages which are formed in the pilot nozzle 35. Each water injection port 42 is formed so as to be inclined toward the inner circumferential side in the radial direction of the pilot nozzle and in the circumferential direction with respect to the center axis O of the pilot nozzle 35. Accordingly, water injected from each water injection port 42 is sprayed on the outer edge portions of flames F1 generated by the fuel injected from the fuel injection port 41 positioned on the inner circumferential side of the plurality of water injection ports 42. As shown in FIG. 3, the envelope drawn by water overlaps the envelope drawn by flames F1.

The plurality of water injection ports 42 are non-uniformly formed in the circumferential direction.

In the present embodiment, among the plurality of water injection ports 42, inclination angles $\theta 1$ of water injection ports 42A of a partial region in the circumferential direction toward the inner circumferential side in the radial direction of the pilot nozzle 35 with respect to the center axis O of the pilot nozzle 35 are different from inclination angles $\theta 2$ of water injection ports 42B of the remaining regions except for the partial region. For example, the inclination angles $\theta 1$ of the water injection ports 42A of the partial region are smaller than the inclination angles $\theta 2$ of the water injection ports 42B (the remaining water injection ports) of the remaining regions except for the partial region.

Accordingly, in water injected from the water injection ports 42 toward the inner circumferential side of the pilot nozzle 35, the water injected from the water injection ports 42A positioned in the partial region in the circumferential direction is injected toward the outer circumferential side relative to other water injection ports 42B. Therefore, the water injected from the plurality of water injection ports 42 of the pilot nozzle 35 is non-uniformly injected to the flames F1 generated by the fuel injected from the central fuel injection port 41, in the circumferential direction. As the inclination angles of the water injection ports 42 toward the inner circumferential side in the radial direction decrease, the distance, in which the water injected from the water injection ports 42 reaches the outer edge portions of the flames F1 on the downstream side in the injection direction of water from the water injection ports 42, increases. Accordingly, axial positions of the flames F1 are non-uniform in the circumferential direction.

Therefore, ignition positions of the fuel injected from the main burners 34, that is, generation positions of the main flames are different from each other in the direction along the center axis O in the circumferential direction due to the flames F1 having different axial positions in the circumferential direction. As the inclination angle $\theta 1$ of the injection angle of water decreases, the generation position of the main flame due to the fuel injected from the main burner 34 transfers to the downstream side in the generation direction of the flame along the center axis O direction.

Figure 6:
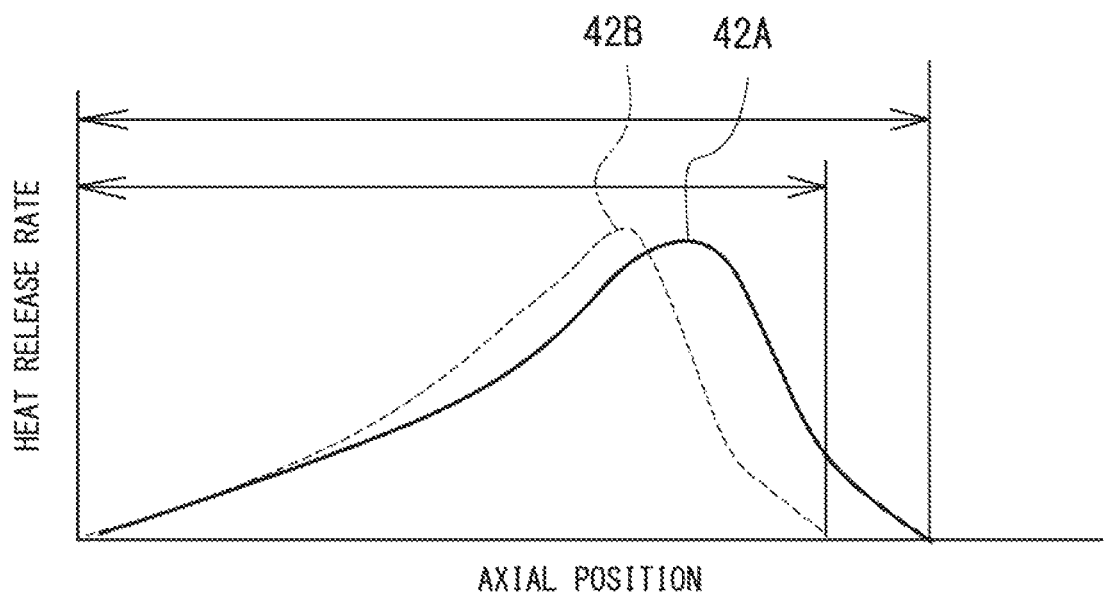
FIG. 6 is a graph showing a relationship between an axial position and a heat release rate in a case where water injection ports are non-uniformly disposed in a circumferential direction.

In this way, the positions in the center axis O direction of the main flames generated in the combustion apparatus 3 are different from each other in the circumferential direction. Accordingly, as shown in FIG. 6, the width in distribution of a heat release rate in the combustion apparatus 3 is widened in the center axis O direction.

Therefore, it is possible to decrease the vibrating force which is generated by one vibration mode due to the flames F1 or the main flames. As a result, it is possible to effectively decrease combustion oscillation.

In addition, in the first embodiment, since the inclination angles of the water injection ports 42 in the radial direction of the pilot nozzle 35 are different from each other, the plurality of water injection ports 42 are non-uniform in the circumferential direction. However, the present invention is not limited to this. Hereinafter, a plurality of embodiments is shown in which the plurality of water injection ports 42 is non-uniformly formed in the circumferential direction. In addition, in the embodiments described below, the entire configuration of the gas turbine 1 or the combustion apparatus 3 is the same as that of the first embodiment. Accordingly, in descriptions below, in the drawings, the same reference numerals are assigned to configurations which are the same as those of the first embodiment, descriptions thereof are omitted, and the configuration of the water injection ports 42 in the pilot nozzle 35 is mainly described.

Second Embodiment

Figure 7:
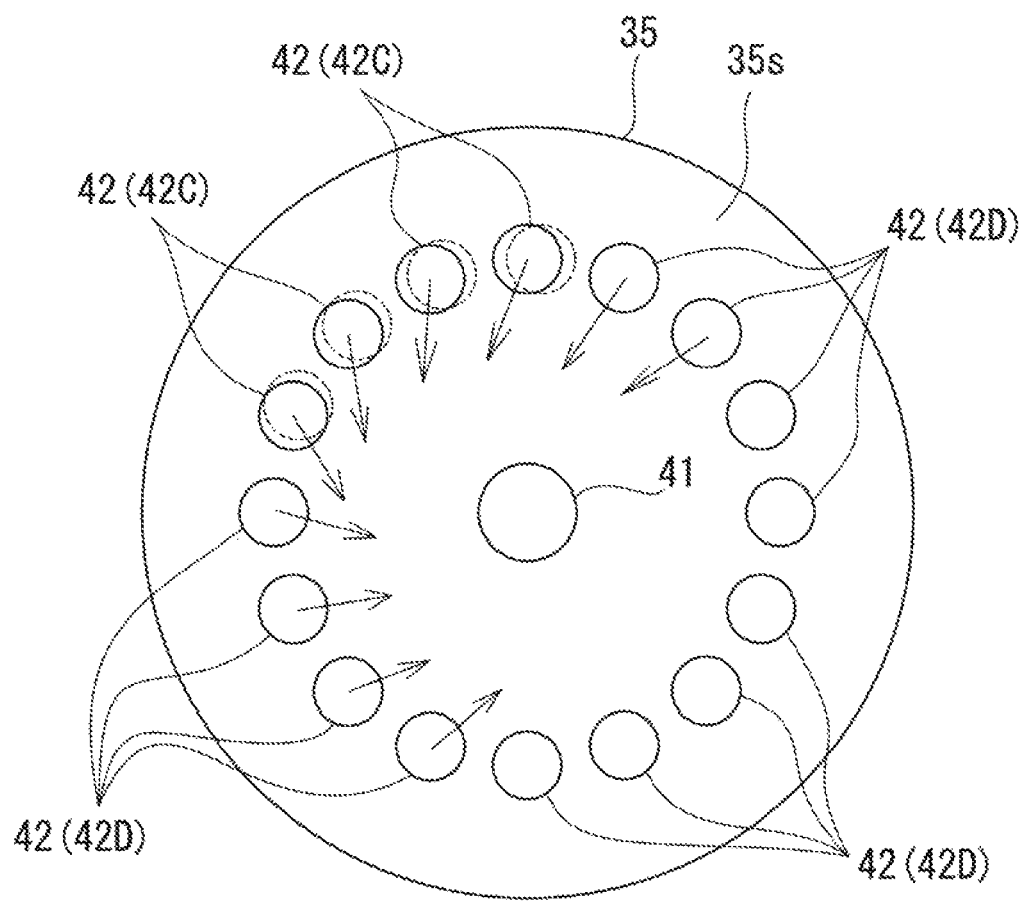
FIG. 7 is a front view showing a tip surface of a combustion apparatus according to a second embodiment.

As shown in FIG. 7, in the pilot nozzle 35 of the combustion apparatus 3 in the present embodiment, among the plurality of water injection ports 42 formed around the fuel injection port 41 with intervals therebetween in the circumferential direction, inclination angles of water injection ports 42C of a partial region in the circumferential direction are different from inclination angles of water injection ports 42D. That is, the inclination angles of the water injection ports 42C in the circumferential direction (a tangential direction at the position where the water injection ports 42C is located) of the pilot nozzle 35 with respect to the center axis O of the pilot nozzle 35 are different from the inclination angles of the water injection ports 42D of remaining regions except for the partial region. For example, the inclination angles of the water injection ports 42C of the partial region are larger than the inclination angles of the water injection ports 42D of the remaining regions except for the partial region.

Accordingly, in water injected from the water injection ports 42, the water injected from the water injection ports 42C positioned in the partial region in the circumferential direction is injected toward the upstream side in the generation direction of the flames F1 relative to other water injection ports 42D.

Accordingly, as shown in FIG. 3, the water injected from the water injection ports 42 is non-uniformly injected in the circumferential direction toward the outer circumferential side of the flames F1 generated by the fuel injected from the central fuel injection port 41. Therefore, the axial positions of the flames F1 are non-uniform in the circumferential direction.

Accordingly, positions at which the flames F1 are propagated to the fuel injected from the main burner 34 and the fuel is ignited are different from each other in the direction along the center axis O. Therefore, as shown in FIG. 6, in the combustion apparatus 3, the heat release rates due to the main flames are distributed along the center axis O direction in the circumferential direction.

As a result, it is possible to decrease a vibrating force which is generated by one vibration mode due to the flames F1 or the main flames. Accordingly, it is possible to effectively decrease combustion oscillation.

Third Embodiment

Figure 8:
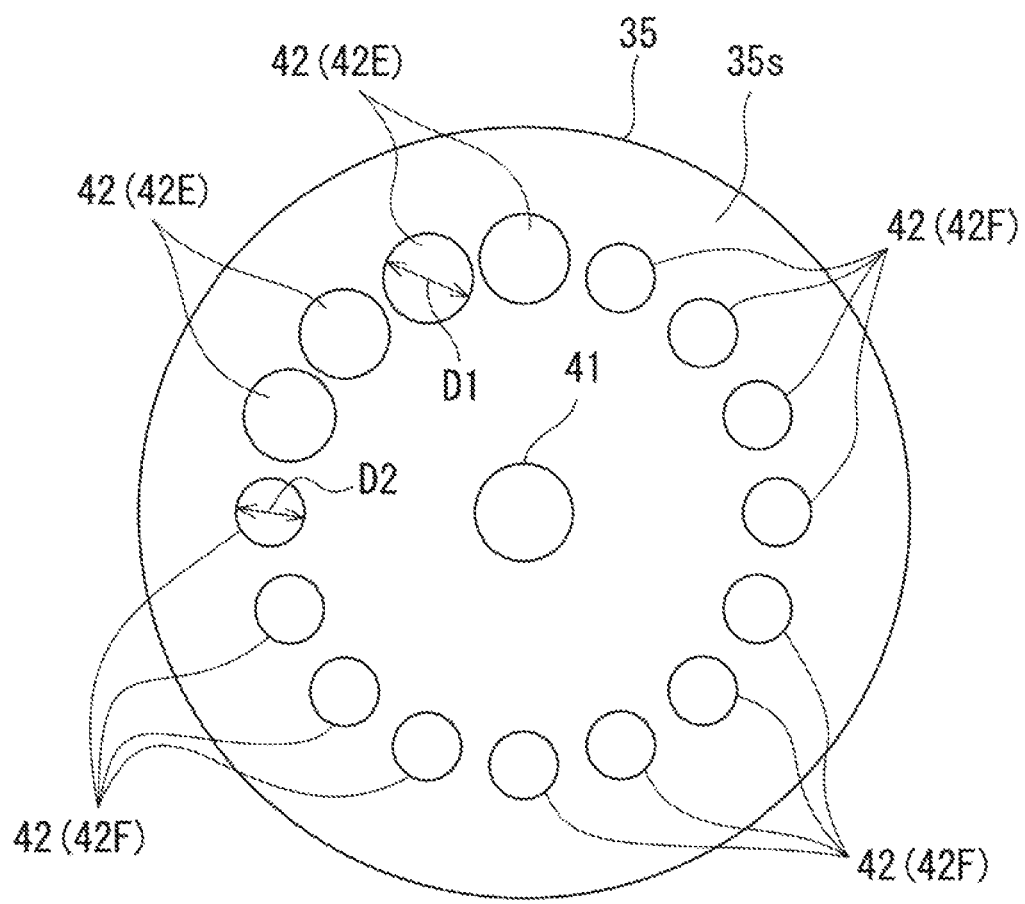
FIG. 8 is a front view showing a tip surface of a combustion apparatus according to a third embodiment.

As shown in FIG. 8, in the pilot nozzle 35 of the combustion apparatus 3 in the present embodiment, among the plurality of water injection ports 42 formed around the fuel injection port 41 with intervals therebetween in the circumferential direction, opening diameters D1 of water injection ports 42E of a partial region in the circumferential direction are different from opening diameters D2 of water injection ports 42F of the remaining regions except for the partial region. For example, the opening diameters D1 of the water injection ports 42E of the partial region are larger than the opening diameters D2 of the water injection ports 42F of the remaining regions except for the partial region.

Accordingly, in water injected from the water injection ports 42, an injection amount of the water injected from the water injection ports 42E positioned in the partial region in the circumferential direction is larger than injection amounts of other water injection ports 42F.

Accordingly, as shown in FIG. 3, the water injected from the water injection ports 42 is non-uniformly injected in the circumferential direction toward the outer circumferential side of the flames F1 generated by the fuel injected from the central fuel injection port 41. Therefore, the axial positions of the flames F1 are non-uniform in the circumferential direction.

Accordingly, positions at which the flames F1 are propagated to the fuel injected from the main burner 34 and the fuel is ignited are different from each other in the direction along the center axis O. Therefore, as shown in FIG. 6, in the combustion apparatus 3, the heat release rates due to the main flames are distributed along the center axis O direction in the circumferential direction.

As a result, it is possible to decrease a vibrating force which is generated by one vibration mode due to the flames F1 or the main flames. Accordingly, it is possible to effectively decrease combustion oscillation.

Fourth Embodiment

Figure 9:
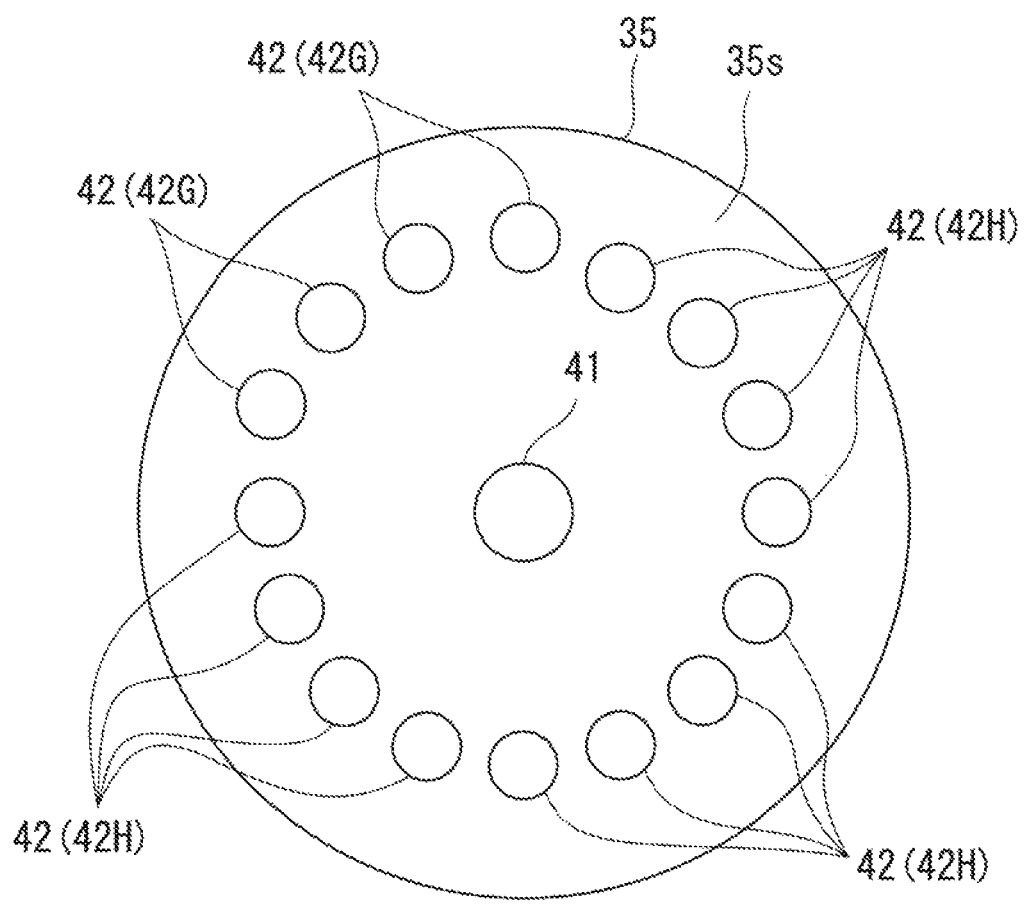
FIG. 9 is a front view showing a tip surface of a combustion apparatus according to a fourth embodiment.

As shown in FIG. 9, in the pilot nozzle 35 of the combustion apparatus 3 in the present embodiment, among the plurality of water injection ports 42 formed around the fuel injection port 41 with intervals therebetween in the circumferential direction, openings of water injection ports 42G of a partial region in the circumferential direction are different from openings of water injection ports 42H. That is, the positions of the openings of the water injection ports 42G in the radial direction of the pilot nozzle 35 are different from the positions of the openings of the water injection port ports 42H of the remaining regions except for the partial region. For example, the openings of the water injection ports 42G of the partial region are positioned on the outer circumferential side in the radial direction of the pilot nozzle 35 relative to the openings of the water injection ports 42H of the remaining regions except for the partial region.

Accordingly, in water injected from the water injection ports 42, the water injected from the water injection ports 42G positioned in the partial region in the circumferential direction reaches the outer edge portion of the flames F1 on the downstream side in the generation direction of the flames F1 relative to other water injection ports 42H.

Accordingly, as shown in FIG. 3, the water injected from the water injection ports 42 is non-uniformly injected in the circumferential direction toward the outer circumferential side of the flames F1 generated by the fuel injected from the central fuel injection port 41. Therefore, the axial positions of the flames F1 are non-uniform in the circumferential direction.

Accordingly, positions at which the flames F1 are propagated to the fuel injected from the main burner 34 and the fuel is ignited are different from each other in the direction along the center axis O. Therefore, as shown in FIG. 6, in the combustion apparatus 3, the heat release rates due to the main flames are distributed along the center axis O direction in the circumferential direction.

As a result, it is possible to decrease a vibrating force which is generated by one vibration mode due to the flames F1 or the main flames. Accordingly, it is possible to effectively decrease combustion oscillation.

Fifth Embodiment

Figure 10:
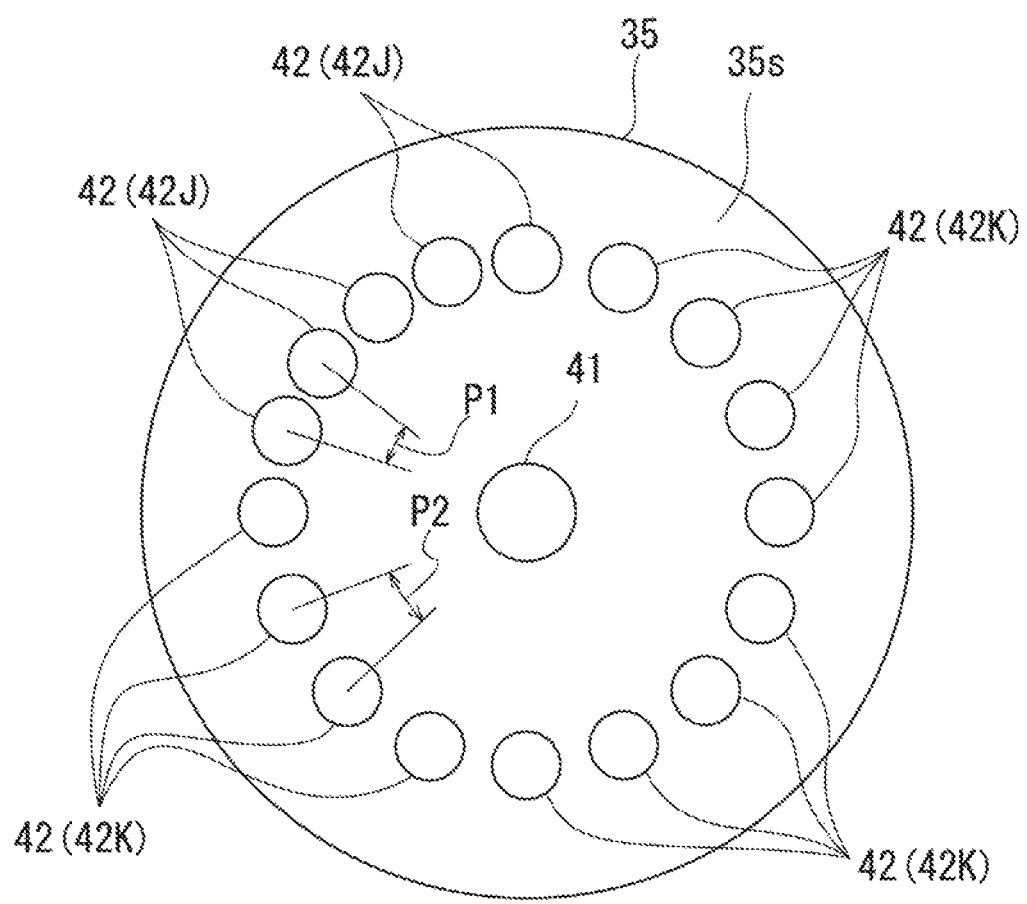
FIG. 10 is a front view showing a tip surface of a combustion apparatus according to a fifth embodiment.

As shown in FIG. 10, in the pilot nozzle 35 of the combustion apparatus 3 in the present embodiment, among the plurality of water injection ports 42 formed around the fuel injection port 41 with intervals therebetween in the circumferential direction, installation intervals of water injection ports 42J of a partial region in the circumferential direction are different from installation intervals of water injection ports 42K. That is, the installation intervals of the water injection ports 42J in the circumferential direction of the pilot nozzle 35 are different from the installation intervals of the water injection ports 42K of the remaining regions except for the partial region. For example, installation intervals P1 in the circumferential direction of the water injection ports 42J of the partial region are smaller than installation intervals P2 of the water injection ports 42K of the remaining regions except for the partial region.

Accordingly, in water injected from the water injection ports 42, the injection amount (injection density) of the water injected from the water injection ports 42J positioned in the partial region in the circumferential direction is larger than the injection amount of the water injected from other water injection ports 42K.

Accordingly, as shown in FIG. 3, the water injected from the water injection ports 42 is non-uniformly injected in the circumferential direction toward the outer circumferential side of the flames F1 generated by the fuel injected from the central fuel injection port 41. Therefore, the axial positions of the flames F1 are non-uniform in the circumferential direction.

Accordingly, positions at which the flames F1 are propagated to the fuel injected from the main burner 34 and the fuel is ignited are different from each other in the direction along the center axis O. Therefore, as shown in FIG. 6, in the combustion apparatus 3, the heat release rates due to the main flames are distributed along the center axis O direction in the circumferential direction.

As a result, it is possible to decrease a vibrating force which is generated by one vibration mode due to the flames F1 or the main flames. Accordingly, it is possible to effectively decrease combustion oscillation.

Other Embodiments

In addition, the present invention is not limited to the embodiments described with reference to the drawings, and various modification examples may be considered within the technical range.

For example, in the embodiments, as an example in which the plurality of water injection ports 42 are non-uniformly formed in the circumferential direction, the plurality of water injection ports 42 are divided into the water injection ports 42A, 42C, 42E, 42G, and 42I positioned the partial regions in the circumferential direction and the water injection ports 42B, 42D, 42F, 42H, and 42K of the remaining regions, except for the partial regions, in the circumferential direction. However, the present invention is not limited to this. The plurality of water injection ports 42 may be non-uniformly formed so as to be divided into many divisions in the circumferential direction.

In addition, the inclination angles, the opening diameter, the positions in the radial direction, and installation intervals of the plurality of water injection ports 42 are formed in two steps such as the partial region in the circumferential direction and the remaining regions except for the partial region, but may be formed in three steps or more.

In addition, the first to fifth embodiments are configured so as to be appropriately combined with each other.

Moreover, in the above-described embodiments, the fuel injection port 41 and the plurality of water injection ports 42 are formed in the pilot nozzle 35. However, the water injection ports 42 may be provided on the outer circumferential side of the pilot nozzle 35 so as to be separated from the pilot nozzle 35.

Moreover, the above-described embodiments have configurations in which the combustion apparatus 3 includes the pilot nozzle 35 at the center portion and the plurality of main nozzles 37 on the outer circumferential side. However, the combustion apparatus 3 may have any configuration, as long as the configuration of the present invention is applied to at least one of the nozzles configuring the combustion apparatus 3.

In addition, the configurations described in the embodiments may be selected within a scope which does not depart from the gist of the present invention, and may be appropriately modified to other configurations.

INDUSTRIAL APPLICABILITY

According to the nozzle, it is possible to effectively decrease combustion oscillation, even in a combustion apparatus in which water is injected to flames.

REFERENCE SIGNS LIST

1: gas turbine
3: combustion apparatus
4: turbine main body
31: combustor basket
32: outer shell
33: pilot burner
34: main burner
35: pilot nozzle (nozzle)
35s: tip surface (tip)
37: main nozzle
41: fuel injection port
42: water injection port
42A, 42C, 42E, 42G, 42J: water injection port
42B, 42D, 42F, 42H, 42K: water injection port

The invention claimed is:

1. A nozzle in which a fuel injection port for injecting a fuel is formed at the center of a tip and a plurality of water injection ports are formed with intervals therebetween in a circumferential direction around the fuel injection port of the tip,
    wherein the plurality of water injection ports are aligned in a line in the circumferential direction, and some of the plurality of water injection ports adjacent to each other are in a first region in the circumferential direction, and some of the plurality of water injection ports are in a second region in the circumferential direction which does not overlap the first region,
    wherein the plurality of water injection ports in the first region are formed such that inclination angles with respect to the central axis of the nozzle in a radial direction of the nozzle are different from inclination angles of the plurality of water injection ports in the second region, and
    wherein the nozzle is a pilot fuel nozzle for generating a flame for igniting a premixture of fuel and air generated by a main burner.

2. The nozzle according to claim 1,
    wherein the plurality of water injection ports in the first region are formed such that opening positions of a radial direction with respect to the central axis of the nozzle of the plurality of water injection ports in the first region are different from opening positions of the plurality of water injection ports in the second region.

3. The nozzle according to claim 1,
wherein the plurality of water injection ports in the first region are formed such that intervals in the circumferential direction of the nozzle are different from intervals of the plurality of water injection ports in the second region.

4. A combustion apparatus including the nozzle according to claim 1,
wherein the main burner includes a main nozzle which injects a fuel and a main swirler provided on a tip portion of the main nozzle, and
wherein a flame is generated and ignites the fuel injected from the main nozzle.

5. The combustion apparatus according to claim 4,
wherein the pilot nozzle is disposed in the center portion, and
wherein a plurality of main nozzles are provided on an outer circumferential side of the pilot nozzle in a circumferential direction.

6. A gas turbine, comprising:
the combustion apparatus according to claim 4; and
a turbine main body which is driven by combustion gas generated by the combustion apparatus.

7. A gas turbine, comprising:
the combustion apparatus according to claim 5; and
a turbine main body which is driven by combustion gas generated by the combustion apparatus.

8. A nozzle in which a fuel injection port for injecting a fuel is formed at the center of a tip and a plurality of water injection ports are formed with intervals therebetween in a circumferential direction around the fuel injection port of the tip,
wherein the plurality of water injection ports are aligned in a line in the circumferential direction, and some of the plurality of water injection ports adjacent to each other in a first region in the circumferential direction are different in size from some of the plurality of water injection ports of a second region in the circumferential direction which does not overlap the first region,
wherein the plurality of water injection ports in the first region are formed such that inclination angles with respect to the central axis of the nozzle in a radial direction of the nozzle are different from inclination angles of the plurality of water injection ports in the second region, and
wherein the nozzle is a pilot fuel nozzle for generating a flame for igniting a premixture of fuel and air generated by a main burner.

* * * * *